United States Patent [19]

Shima

[11] 4,115,506
[45] Sep. 19, 1978

[54] METHOD FOR PRODUCING INJECTION MOLDED SKI

[75] Inventor: Yoshiharu Shima, Ueda, Japan

[73] Assignee: Nissei Plastics Industrial Co., Ltd., Japan

[21] Appl. No.: 845,542

[22] Filed: Oct. 26, 1977

Related U.S. Application Data

[62] Division of Ser. No. 751,755, Dec. 17, 1976.

[51] Int. Cl.² ............................. B29D 3/00; B29F 1/00
[52] U.S. Cl. ..................................... 264/250; 264/255; 264/277; 264/320; 264/328; 425/123
[58] Field of Search ............... 264/259, 275, 250, 255, 264/328, 329, 320, 277; 425/123, 129 R; 280/610

[56] References Cited

U.S. PATENT DOCUMENTS

| | | | |
|---|---|---|---|
| 2,695,178 | 11/1954 | Rheinfrank | 280/610 |
| 3,503,621 | 3/1970 | Schmidt et al. | 280/610 |
| 3,635,482 | 1/1972 | Holman | 280/610 |
| 3,816,573 | 6/1974 | Hashimoto et al. | 280/610 |
| 3,918,731 | 11/1975 | Legrand | 280/610 |
| 3,928,106 | 12/1975 | Molnar | 280/610 |

*Primary Examiner*—Willard E. Hoag
*Attorney, Agent, or Firm*—Weingarten, Maxham & Schurgin

[57] ABSTRACT

A method for making an improved injection molded ski having excellent mechanical properties comprising an injection molded ski body made of thermoplastic resin provided with a pair of edge receiving portions on the bottom surface thereof, a pair of steel edges attached to the edge receiving portions and a sole plate integrally formed by the injection molding process of thermoplastic resin on the bottom surface of the ski body.

4 Claims, 12 Drawing Figures

METHOD FOR PRODUCING INJECTION MOLDED SKI

This is a division of application Ser. No. 751,755, filed Dec. 17, 1976.

BACKGROUND OF THE INVENTION

This invention relates to a method for producing an injection molded ski. More particularly, the invention relates to an improved injection molding method for producing a novel injection molded ski having excellent properties using thermoplastic resin materials.

It is well known in the field of ski manufacturing that skis are produced by means of injection molding of thermoplastic resins. However, except simple and low-grade ones, it has been considered to be quite difficult to produce skis integrally through injection molding by using thermoplastic resins since the attaching of steel edges is not easy.

Further, when steel edges are attached to both the side edges of the sole plate or bottom running surface of a ski body with set screws, stress is set up in screw holes, and if the ski is bent too much, cracks are caused to occur in the portions of screw holes to result in the damage of the ski. Accordingly, even when a ski body and a sole plate are integally formed together by injection molding, the strength of such ski is inferior to that of conventional ones and still more investigation for producing the injection molded skis is required.

The inventor of the present application has made eager and extensive studies on the production of skis through injection molding method, and as the result, the present invention has been accomplished.

BRIEF SUMMARY OF THE INVENTION

It is therefore an object of the present invention to provide a plastic ski which is free from the above-mentioned disadvantages caused to occur in conventional ones.

Another object of the invention is to provide an improved injection molded ski having excellent strength and other characteristics.

Further object of the invention is to provide an improved injection molding method for producing such skis, by which method quite satisfactory skis can be produced with neither difficulty nor troubles.

According to the present invention, the ski consists of ski body, a sole plate and a pair of steel edges. These members are put tightly together in injection molding process. The ski body constituting the main portion of a ski is provided with a pair of edge receiving portions on both the longitudinal sides of the bottom surface. Each edge receiving portion is provided with a plurality of projections generally formed at regular intervals, with which projections a steel edge is attached to the ski body. Between the pair of edge receiving portions on the bottom surface of the ski body is an uneven abutting surface to receive thereon the above-mentioned sole plate. After the steel edges are applied to the projections formed on the edge receiving portions, the sole plate is formed on the lower surface of the ski body, in which the sole plate is firmly secured to the uneven lower surface of the ski body and to the projections on the edge receiving portions with interposing the steel edges.

In the method for producing plastic skis of the present invention, the ski body having the edge receiving portions is firstly made by injection molding, the die is then opened to attach a pair of steel edges to the projections on the edge receiving portions of ski body, and finally, the die is again closed with another different half mold and the sole plate is then formed by injection molding.

In accordance with the method of the present invention, the bonding of the ski body, sole plate and steel edges are easily and reliably performed as compared with the conventional method because the sole plate is adhered to the ski body in fused state. Therefore, even when the ski of the present invention is intensely bent in the use, the component parts are hardly peeled off. Further, the steel edges are attached to the ski body through the above-mentioned improved injection molding process without using any set screws so that the edges are easily secured to the ski body without the troublesome work as that caused in the conventional method.

In addition to the above advantages, the skis produced through the method of the present invention have other merits in the excellence of several mechanical properties such as bending strength, fatigue deformation, torsional rigidity, and impact strength.

There are various kinds of thermoplastic resins applicable to the above-disclosed injection molding method, however, exemplified as the most typical ones are ABS (acrylonitrilebutadiene-styrene) resin and glass fiber reinforced ABS resin. Like the ordinary skis, those of the present invention may also be finished on the surfaces thereof by using various kinds of coating materials and coloring materials.

BRIEF DESCRIPTION OF THE DRAWINGS

These and other objects and features of the invention will become more apparent from the following description taken in connection with the accompanying drawings in which.

DETAILED DESCRIPTION OF THE PREFERRED EMBODIMENTS

Figure 2:
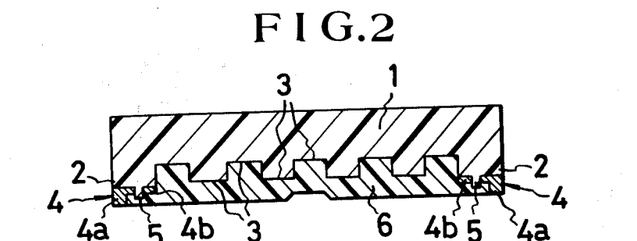
FIG. 2 is a cross-sectional view of the same embodiment.
Figure 3:
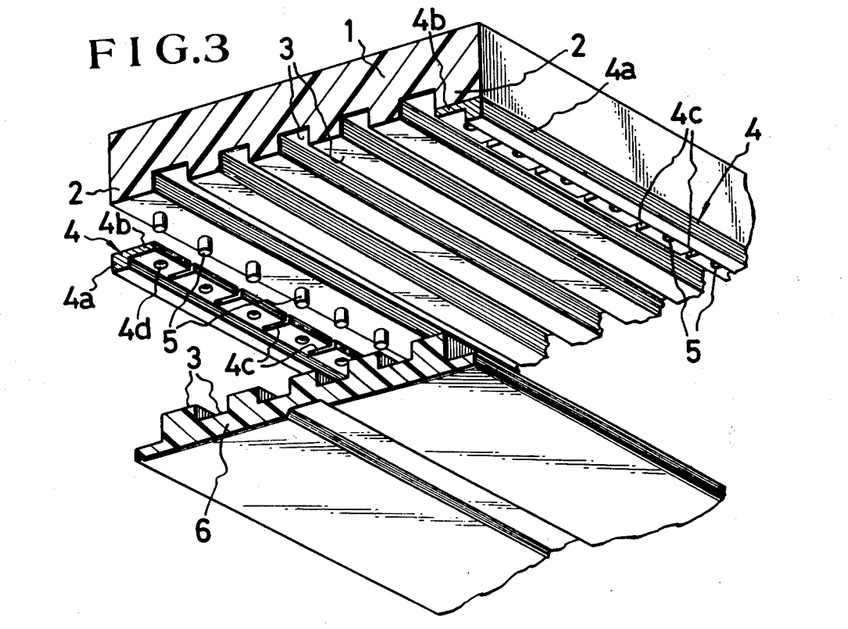
FIG. 3 is a perspective exploded view of the same embodiment taken from the under side.

Referring now to the accompanying drawings, some embodiments of the present invention will be described in the following.

a ski body 1 having a configuration similar to that of conventional one is made by injection molding with using a thermoplastic resin, for example, ABS resin containing 10% of glass fiber. As shown in FIG. 2, the ski body 1 has a smooth top surface and a corrugated or grooved bottom surface 3. The grooves formed in the bottom surface 3 are arranged in a plurality of rows along the longitudinal siides of the ski body 1. On both the longitudinal edge portions of the bottom surface 3 are formed edge receiving portions 2 which are provided with a plurality of projections 5 as shown in FIG. 3. The projections 5 are generally formed at regular intervals for receiving the apertures of the below mentioned fixing pieces 4b of the steel edges 4, and the length or height of each projection 5 is made somewhat larger than the thickness of the fixing piece 4b of the steel edge 4.

The steel edge 4 is made of a long, flat an angled steel and the edge body 4a is provided with a plurality of fixing pieces 4b at regular intervals interposing therebetween a plurality of narrow cuts 4c. Formed in the middle portion of each fixing piece 4b is an aperture 4d which is to be caught by the above-mentioned projection 5. Thus when the steel edges 4 are attached to the ski body 1, the projections 5 on the edge receiving portions 2 are fitted into the respective apertures 4d of the fixing pieces 4b and the steel edges 4 are pressed against the edge receiving portions 2. In order to attach the steel edges 4 firmly to the ski body 1, if desired, the protruding ends of the projections 5 may be melted down into the form like a rivet head.

Then the bottom surface 3 of the ski body 1 is applied with a sole plate 6 by injection molding of a thermoplastic resin as ABS resin. As shown in FIG. 2, the top or upper side of the sole plate 6 adheres tightly to the grooved bottom surface 3 of the ski body 1 and the bottom surface, that is the running surface, of the sole plate 6 is aligned with the lowermost edges of the edge bodies 4a. When this sole plate 6 is formed by injection molding, the molten resin is brought into contact with the grooved bottom surface 3 and the protruding ends of the projections 5 and then it is solidified as it stands. Thus the steel edges 4 are tightly held between the ski body 1 and the sole plate 6, in addition, they are firmly fixed by the projections 5. With the above-disclosed structure, the steel edges 4 are not released as far as the projections 5 are not damaged. Further, since the sole plate 6 is formed on the under side of the ski body by injection molding, the sole plate 6 can be firmly bonded to the ski body 1 and even when the ski is bent, the sole plate 6 is not peeled off from the ski body 1 and the steel edges 4. Therefore, the ski of the present invention having the above-disclosed unified structure is safe and durable in practical uses.

In the following, the injection molding method of the present invention for producing the above-disclosed ski will be explained with reference to the accompanying drawings, especially to FIGS. 4 to 8.

Figure 1:
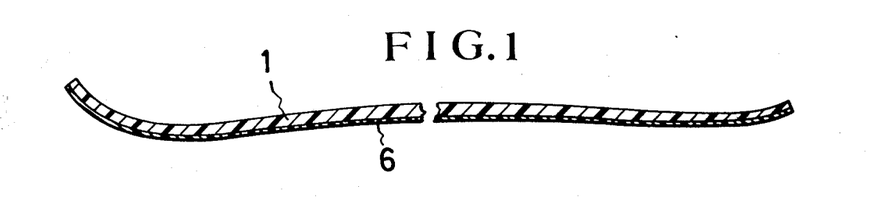
FIG. 1 is a longitudinal sectional view of an embodiment of the ski of the present invention.
Figure 4:
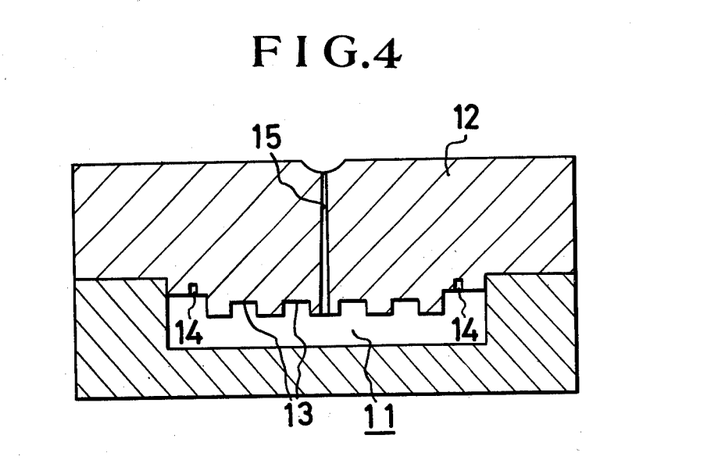
FIG. 4 is a cross-sectional view of a set of molds for injection molding.

As shown in FIG. 4, a female mold 10 and a first mold half 12 are closed by putting them together. The female mold 10 has mold surfaces for forming the top and both side surfaces of a ski body 1. It is to be noted that the positioning of the cavity 11 is upside-down relative to the foregoing FIGS. 1 to 3. The first mold half 12 has a mold surface 13 to form the bottom surface 3 and the edge receiving portions 2 of the ski body 1. Further, a plurality of holes 14 are formed along the longitudinal sides (perpendicular to FIG. 4) of the mold surface 13.

The mold surface 13 of the first mold half 12 is a little lowered into the cavity 11 of the female mold 10. The distance between the boundary plane of both the mold halves 10, 12 and the surface to form the edge receiving portions (indicated by "*l*" in FIG. 5) coincides with the *height of edges 4.*

Figure 5:
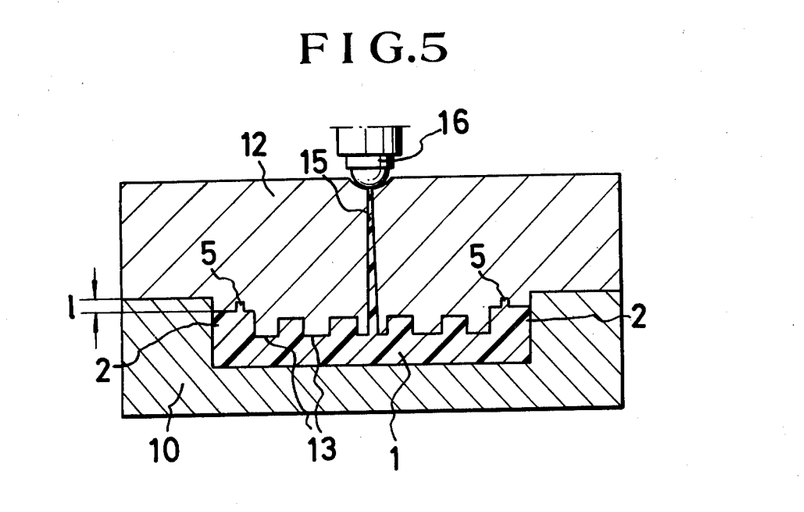
FIG. 5 is a cross-sectional view of the same molds which are fed with the material for ski body.
Figure 6:
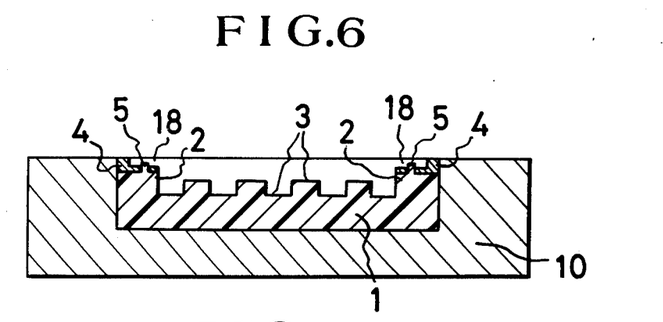
FIG. 6 is cross-sectional view of the female mold carrying a molded ski body to which a pair of steel edges are fitted.

In the next step as shown in FIG. 5, the injection nozzle 16 is brought into contact with the sprue 15 of the first mold half 12 and molten thermoplastic resin (e.g. ABS resin containing 10% of glass fiber) is then injected into the cavity 11 to form a preliminary molding of the ski body 1 having integral parts of edge receiving portions 2 and a plurality of projections 5.

In the above embodiment, the sprue 16 may be formed in any portion of the ski body 1, however, it may be advantageously positioned at the tail end of the ski body 1 in order to make the material flow unidirectional and to prevent the occurrence of dead points of material.

The set of molds is then opened by removing the first mold half 12, and the female mold 10 with the molded ski body 1 is shifted to the position of a secondary mold half 17. A pair of steel edges 4 are respectively fitted into the spaces 18 which are previously formed by the mold surface 13 of the first mold half 12. When the steel edges 4 are attached, the apertures 4d of fixing pieces 4b are fitted to the projections 5 on the edge receiving portions 2 so that the lateral movement of the edges 4 can be avoided. The bottom surfaces (upper side in FIG. 6) of the edges 4 are positioned on the same level as the upper surface (parting line) of the female mold 10. Therefore, when the second mold half 17 is applied to the female mold 10, the steel edges 4 are firmly and accurately placed on the edge receiving portions 2 of the ski body 1.

In place of the above procedure, if desired, the molded ski body 1 can be once taken out from the female mold 10 and the steel edges 4 are fitted to the edge receiving portions 2 outside the female mold 10. And after that, the assembly may be again inserted into the female mold 10 shifted under the second mold half 17 or another similar female mold 10 under the second mold half 17. With such process, a special molding machine is not required since the shifting of the female mold 10 can be avoided.

Figure 8:
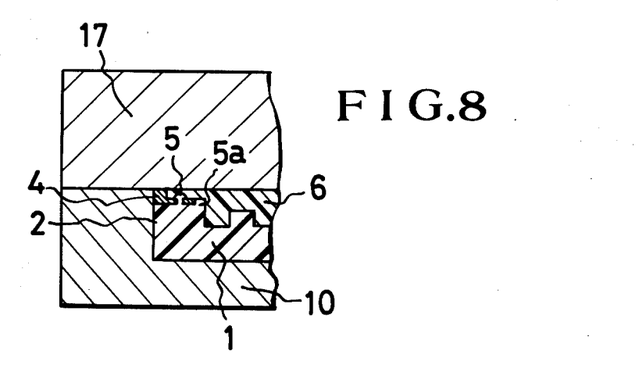
FIG. 8 is a partial cross-sectional view of another embodiment of a set of molds.

Further, in another embodiment, the ski body 1 may be provided with a continuous ridge 5a on the inside of each edge receiving portion 5 as shown in FIG. 8. With such structure, the fitting of steel edges 4 can be made more reliable. Still further, after the fitting of steel edges 4 to the edge receiving portions 2, the protruding end of each projection 5 may be thermally pressed down like rivets as shown in FIG. 8. It will be understood that these modified structures are effectual for the reliable securing of the steel edges 4 to the ski body 1.

Figure 7:
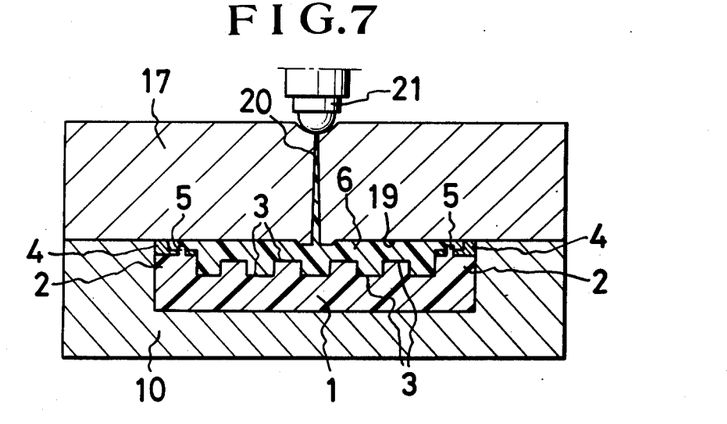
FIG. 7 is a cross-sectional view of a set of molds in which the female mold is applied with a male mold different from that of FIG. 4 or 5.

After the fitting of steel edges 4, the second mold half 17 is placed on the female mold 10 carrying the ski body 1 with the steel edges 4 as shown in FIG. 7. The second mold half 17 has a mold surface 19 that forms the running surface of the ski. The mold surface 19 has a flat face generally positioned on the same level as the parting line between the molds, and a middle longitudinal projection to form a cross-sectionally arcuate groove in the running surface of a ski to be formed. After the closing of the second mold half 17, an injection nozzle 21 is brought into contact with the inlet of a sprue 20 and molten thermoplastic resin (for example ABS resin) is injected into the space between the ski body 1 and the mold surface 19, thereby forming a sole plate 6 of the ski. In this process, the steel edges 4 are tightly secured between the longitudinal sides of the sole plate 6 and the edge receiving portions 2 of the ski body 1, at the same time, the protruding ends or flattened ends of the projections 5 (and 5a) are well bonded to the material of sole plate 6.

As disclosed above, the durability of ski is excellent as compared with that of the conventional ones because the ski body 1 and the sole plate 6 are integrally formed by using thermoplastic resins without the use of any adhesive agent. Further, the steel edges are also integrally secured between the ski body and the sole plate by injection molding, accordingly, the concentration of stress to attaching screws can be successfully avoided. Therefore, the ski of the present invention can be prevented from the peeling of the sole plate and loosening or breaking off of the steel edges. Furthermore, the integral formation of the ski body and the sole plate can be performed by using the same female mold in a continuous manner, so that any special technique is not required and the injection molding of the ski body and the sole plate with different thermoplastic materials can be quite easily carried out. Therefore, the present invention is very useful in view of ski manufacturing.

Performance Tests

1. Flexural Rigidity and Maximum Bending Strength

The skis of the present invention were produced according to the above-disclosed method by using ABS resin reinforced with 10% by weight of glass fiber for ski body portions and sole ABS resin for sole plates, and they were compared with commercially available skis as follows:

Table 1
Skis Used for Tests

| Symbol | Description | Total Length | L (See below) |
|---|---|---|---|
| A | Semi-plywood ski | 110 cm | 830 mm |
| B | Fiber glass reinforced plastic ski | 110 cm | 830 mm |
| C | Ski of this invention | 110 cm | 830 mm |
| D | Fiber glass reinforced plastic ski | 140 cm | 1130 mm |
| E | Semi-plywood ski | 140 cm | 1130 mm |
| F | Ski of this invention | 140 cm | 1130 mm |

Figure 9:
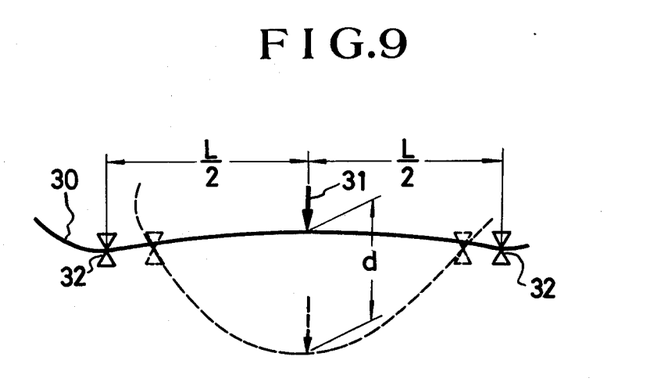
FIG. 9 is a schematic illustration of the state of bending tests.

In the above Table 1, the skis A, B, D and E were bought from the market. Each ski 30 was supported as shown by the solid lines of FIG. 9, and a load 31 was applied to the center of the ski 30 between the supports 32. The initial distance between the supports 32 was L cm. The ski 30 was gradually bent down by the load 31 as shown by the dash lines in the same figure and finally the ski 30 was broken.

Figure 10:
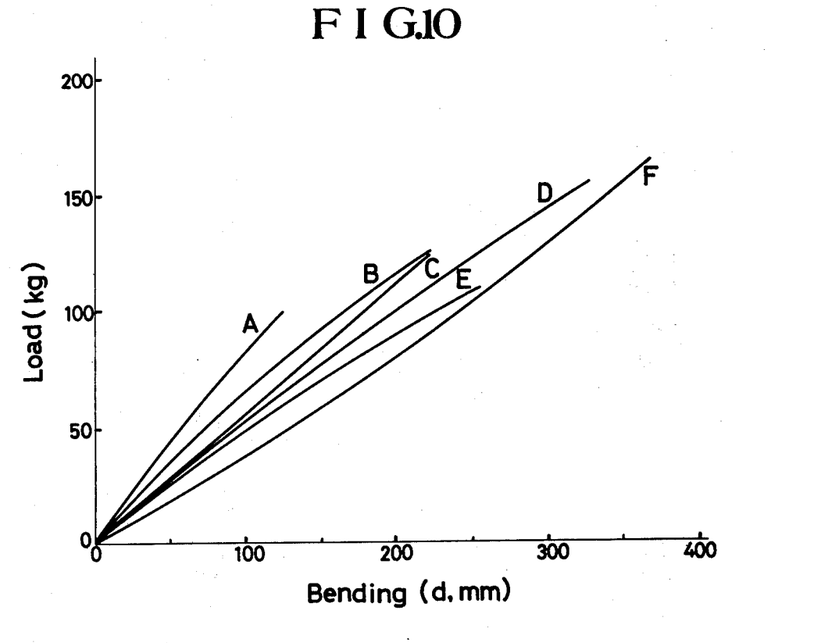
FIG. 10 is a graphic chart showing the results of bending tests.

The relation between the load (kg) and bending (d, mm), and the maximum bending strength (kg) were measured, the result of which are shown in FIG. 10. The numerals indicated at the free ends of resultant curves are the maximum loads (kg) and the bendings (d, mm) when the skis were broken.

From the results shown in FIG. 10, it may be understood that the skis of this invention are excellent in view of the flexural rigidity and maximum bending strength as compared with those of the conventional ones.

2. Fatigue Deformation

Figure 11:
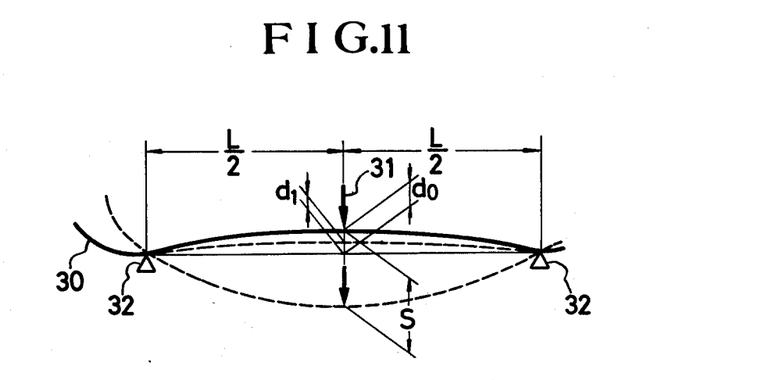
FIG. 11 is a schematic illustration of the state of fatigue deformation tests.

Each ski 30 was set as shown in FIG. 11 between the supports 32 and it was bent by applying a load 31 for the stroke S mm. The bending operation was continually repeated at 45 to 50 cycles per minute and at each of 500, 1000, 2000, 3000, 4000 and 5000 bendings, the vertical distance between the horizontal center of both supports 32 and the center of a ski (indicated by the symbol $d_1$ in FIG. 11) was measured. Thus obtained value $d_1$ was compared with the initial arch bend $d_o$ as shown in FIG. 11.

Thus the value of arch bend durability (%) was obtained according to the following equation:

$$\frac{d_1}{d_0} \times 100 = \text{Arch bend durability}$$

The data of the skis used for the tests and some test conditions are shown in the following Table 2.

Table 2
Skis and Test Conditions

| Symbol | Description | Total Length (cm) | L (mm) | $d_0$ (mm) | S (mm) |
|---|---|---|---|---|---|
| A | Finly foamed polystyrene | 110 | 830 | 7.4 | 80 |
| B | Ski of this invention | 110 | 830 | 7.2 | 80 |
| C | " | 140 | 1130 | 11.5 | 150 |
| D | Semi-plywood ski | 120 | 930 | 7.0 | 80 |
| E | Fiber glass reinforced plastic ski | 110 | 830 | 4.0 | 80 |

Figure 12:
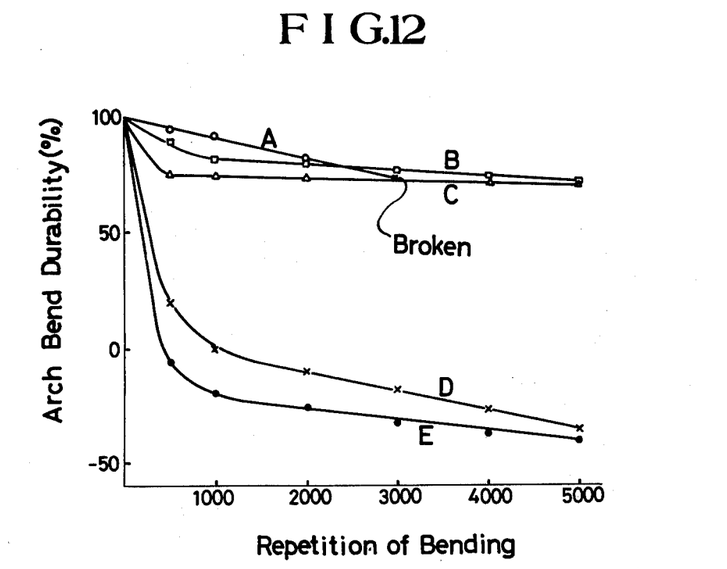
FIG. 12 is a graphic chart showing the results of fatique deformation tests.

The skis A, D and E were obtained from the market and the skis B and C were made according to the method of this invention by using ABS resin reinforced with 10% by weight of glass fiber for ski bodies and ABS resin for sole plates. The results of the tests are shown in FIG. 12.

The ski A was broken before 3000 bendings even though the fatigue deformation of ski A was small. Further, it will be understood from the results shown in FIG. 12 that the fatigue deformations of the skis of this invention are very small as compared with those of the commercially available ones.

3. Impact Resistance

In this test, each ski was loaded with a 20 kg weight, then caused to glide on a horizontal plane by an air cylinder and allowed to collide with a vertical solid wall surface at a speed of 5.4 m/s (19.5 km/hr). In the tests, three kinds of 140 cm skis were used. A plywood ski was broken off at the point near the front bent end. Another glass fiber reinforced plastic ski was folded at a similar point. The ski of this invention similar to those used in the foregoing tests was bent to some extent but it was not broken off.

From the above tests, it will be understood that the mechanical properties of the ski produced according to the present invention are quite good. This is owing to the fact that the ski body, sole plate and a pair of continuous steel edges are integrally and firmly joined together by injection molding.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A method for producing injection molded skis which comprises:

(A) closing a pair of molds including a female mold having mold surfaces for forming the top surface and both side surfaces of a ski body and a first mold half having mold surfaces to form a bottom surface and edge receiving surfaces having a plurality of projections, of said ski body, and injecting molten thermoplastic resin into the cavity of said closed molds to form a ski body having edge receiving protions with said projections;

(B) opening said molds by removing said first mold half from said female mold and fitting a pair of steel edges to said edge receiving portions by fixing said steel edges to said projections on said edge receiving portions; and (C) closing said female mold with a second mold half forming another cavity between said ski body and said second mold half, and injecting thermoplastic resin into said another cavity to form a sole plate which is integrally joined with said ski body and said steel edges.

2. A method for producing injection molded skis as claimed in claim 1 wherein after the fitting of said steel edges to said edge receiving portions in clause (B), the protruding ends of said projections are thermally pressed down.

3. A method for producing injection molded skis as claimed in claim 1 wherein said injection molded ski body is once taken out from said female mold after the mold opening and before the fitting of said steel edges in clause (B) and said ski body that is provided with said steel edges are again fitted into the female mold before said female mold is closed with said second mold half in clause (C).

4. A method for producing injection molded skis as claimed in claim 1 wherein ABS resin reinforced with fiber glass is used for the injection molding in clause (A) and ABS resin is used for the injection molding in clause (C).

* * * * *

UNITED STATES PATENT AND TRADEMARK OFFICE
CERTIFICATE OF CORRECTION

PATENT NO. : 4,115,506
DATED : September 19, 1978
INVENTOR(S) : Yoshiharu Shima

It is certified that error appears in the above-identified patent and that said Letters Patent are hereby corrected as shown below:

Column 3, line 1, "a ski body" should read --A ski body--;
line 8, "siides" should read --sides--;
line 18, "an" should read --and--.
Column 4, lines 5 and 6, "in FIG. 5) coincides with the height of edges 4." should read --in FIG. 5) coincides with the height of edges 4.--;
line 22, "secondary" should read --second--.

Signed and Sealed this

Twentieth Day of March 1979

[SEAL]

Attest:

RUTH C. MASON
Attesting Officer

DONALD W. BANNER
Commissioner of Patents and Trademarks